INVENTORS.
Fred W. Mowrey
Donald A. Tench
BY
*Webb, Mackey & Burden*
THEIR ATTORNEYS Feb. 28, 1961 F. W. MOWREY ET AL 2,972,836
GLASS DRAWING APPARATUS
Filed Nov. 6, 1957 2 Sheets-Sheet 2

INVENTORS.
Fred W. Mowrey
Donald A. Tench
BY
Webb, Mackey & Burden
THEIR ATTORNEYS

United States Patent Office 2,972,836
Patented Feb. 28, 1961

2,972,836

GLASS DRAWING APPARATUS

Fred W. Mowrey, New Kensington, and Donald A. Tench, Jeannette, Pa., assignors to American Window Glass Company, Pittsburgh, Pa., a corporation of Pennsylvania Filed Nov. 6, 1957, Ser. No. 694,786

6 Claims. (Cl. 49—17)

This invention relates to the manufacture of sheet glass and to the annealing and cooling thereof as the sheet is substantially continuously drawn from a molten bath of glass. More particularly, it relates to the improvement of providing damper apparatus for controlling air circulation adjacent the sheet whereby eddy currents and columns of turbulent air are stabilized and controlled in the immediate vicinity of the sheet being annealed and cooled.

In the Fourcault process of manufacturing sheet glass, the molten glass in a pit above the bath is caused to flow or well upwardly through a slot in a debiteuse. It is then passed between coolers within the pit or drawing chamber and is stretched and set and thereafter carried upwardly through a vertically extending annealing and cooling lehr which houses part of the drawing mechanism. Adjacent the top of the lehr the continuously rising glass sheet is scored and cut into desired lengths.

The zones through which the sheet successively passes are in atmospheric communication and the heat in the drawing pit and the heat given off by the cooling of the glass as it moves upwardly through the various zones produces uncontrolled currents of air which flow from the stretching and setting zone in the direction of travel of the sheet. Consequently, currents of colder air and stray gases are inducted thereby causing turbulence and unequalized heat during stretching, setting, annealing, and cooling which results in nonuniform cooling of the glass. Similar difficulties are encountered in other drawing processes in which the sheet is drawn vertically from the bath of molten glass and then passed through a horizontally extending lehr.

By a known manufacturing practice, cross currents of forced air are provided to interrupt the foregoing draft effects but where a substantial amount of the gas being circulated is not carried from one edge of the sheet being drawn to at least the other edge and where it instead passes vertically along the sheet, there is a substantial tendency for it to rise with the sheet and create drafts and heat waves leading to distortion in the finished product. The air currents or heat waves themselves are also conducive to instability of air pressure in the direction of the width of the sheet. If the forced air flow is not of a uniform character substantially eliminating all turbulence, the resulting product will have waves or batter, both of which produce distortion of light passing through the finished product.

The present invention largely eliminates the foregoing irregularities by the provision of vertically spaced dampers which divide the lehr at various zones or levels between successive drawing rolls so as to control the transfer of gas to and from those levels. The result is a fairly high but equalized temperature condition in the gas surrounding the sheet with a consequently stable atmospheric pressure and equalized transfer of heat from the glass to that gas. These results are particularly necessary in case of pit installations having auxiliary heaters provided therein which, in bringing certain of the inner faces thereof to a heated condition to correct temperature differentials, cause additional hot air currents which must be controlled.

More specifically, we utilize horizontally disposed dampers at levels below several successive roll sets and which extend inwardly from opposite faces of the drawing lehr toward the rising glass sheet. Tests have shown that in some cases, prior to the installation of these dampers, temperature levels were high at one end of the lehr and low on the other, indicating rising atmospheric currents on the hotter end and a descending current or down draft on the other end. These tests further showed that there was a consistently upwardly flowing atmosphere near the center of the lehr. To control this unbalanced condition we form the dampers with minimum space in the center and with mutually diverging edges causing the narrow damper opening to widen at each end. Consequently, more resistance is offered to the upwardly flowing atmosphere near the center of the lehr which is of less density due to its higher temperature.

The greater resistance to upward flow at the center forces the warmer, less dense atmosphere laterally towards the ends of the machine thereby bringing the columns of air at those ends into controlled collateral movement with one another and particularly reducing the strength of downward flow at either or both ends. For greater flexibility in control, the dampers are made adjustable to vary the size of the damper slot or opening at different points between its center and opposite ends, especially the latter. Thus, more or less resistance to flow can be selectively provided to the rising or downwardly flowing atmosphere at the ends of the machine depending on the settings of the dampers and with experience, a proper adjustment is readily reached to make the temperature have a uniform or equalized relation across the width of the glass sheet for any given drawing speed.

It is highly desirable to maintain uniformity of cooling and this cooling may be readily obtained by the apparatus above described. We are thus able to reduce and spread out the initial permanent strain as the glass sets and can accordingly provide improved annealing and cooling and relatively fast drawing speeds without excessive breakage in the machine or attendant breakage of the sheets later in the storage rack. Perhaps more importantly, this damper apparatus produces the results of reducing bow and warp in the glass sheet and reducing down drafts in the drawing pit which are a further cause of visual distortion.

Further features, objects and advantages will either be specifically pointed out or become apparent from the following description taken in conjunction with the accompanying drawings which show preferred embodiments of our invention. In the drawings.

Figure 1:
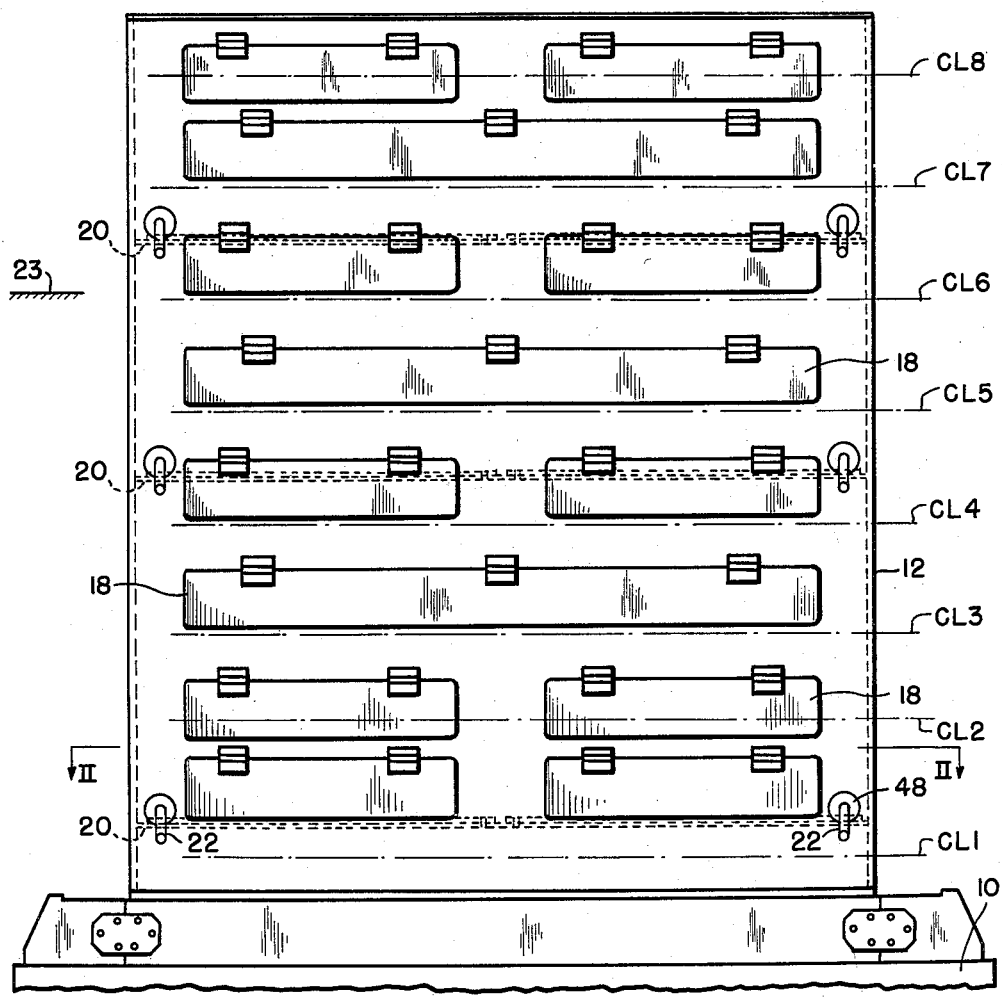
Figure 1 is a face view in elevation of a glass drawing apparatus embodying our invention.
Figure 2:
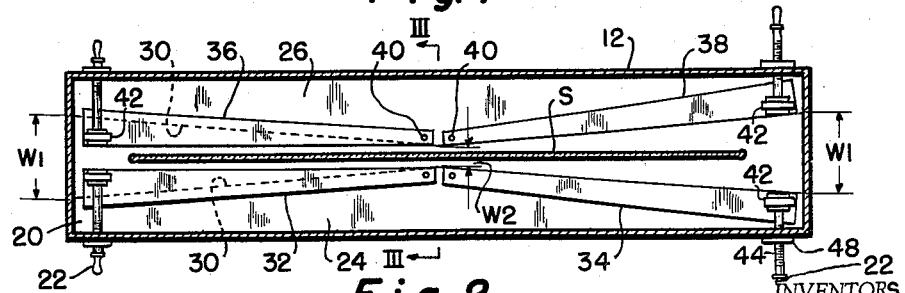
Figure 2 is a sectional view taken along the lines II—II of Figure 1.
Figure 3:
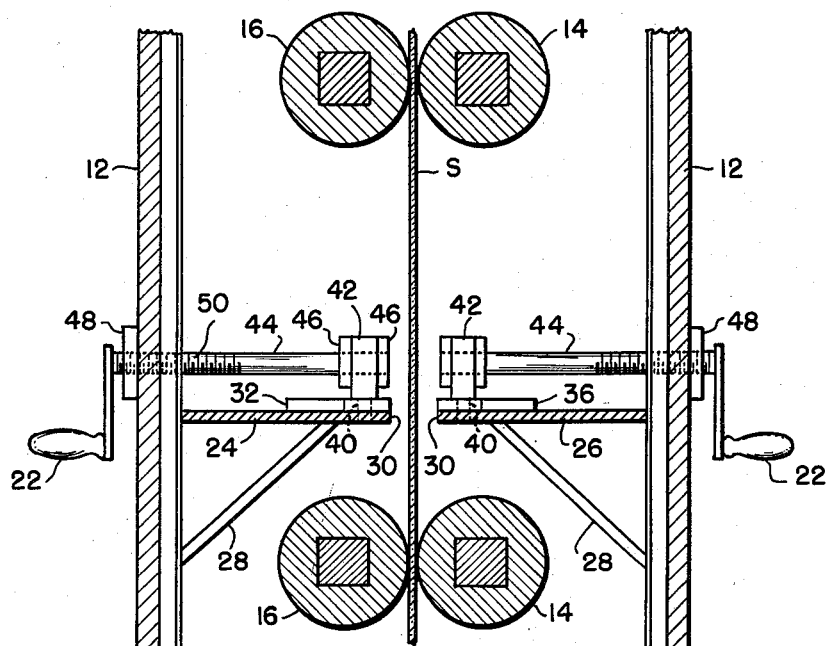
Figure 3 is a transverse sectional view taken along the lines III—III of Figure 2; and, Figures 4 and 5 are respective sectional and transverse sectional views similar to Figures 2 and 3, but showing a modification of the invention.

In Figures 1 to 3 of the drawings, a sheet of glass S is started vertically in well-known manner from a bath of molten glass in a drawing pit 10 and is drawn upwardly into the base of a drawing machine proper or lehr 12. The lehr 12 is an annealing and cooling lehr and is provided with a plurality of roll sets of which eight are indicated at the proper levels by their center lines CL1, CL2, respectively, through CL8, inclusive, each set consisting of opposed glass carrying rolls 14 and 16 with the lehr being of sufficient length to permit further cooling and annealing of the glass sheet being drawn to a point where it can be manually or otherwise handled. At the top of the lehr the rising sheet or ribbon is separated into individual sheets and the sheets are removed to a cutting room for cutting them into smaller sizes.

It is desirable that there be no uncontrolled gaseous movement immediately adjacent the glass sheet in the drawing pit 10. Therefore, we prefer that the pit be kept as tightly closed as practicable during operations in order to materially reduce air infiltration and accommodate only controlled movement of the heated pit gases without appreciable dilution. Pit heaters of the strip or other suitable electrical type, which are omitted from the drawings for the sake of clarity, may be provided in the pit 10 to correct temperature differentials along the incandescent inner faces thereof. It is also preferable that all doors indicated at 18 on the drawing machine proper remain closed at least up to and above the center line CL8 of the eighth set of rolls 14, 16.

For the control of columns of moving air within the machine proper, we provide dampers 20 which are readily identifiable by their adjustable control crank handles 22 which they individually carry. Any suitable number of these dampers may be employed although it has been found unnecessary to have more than about three, all of which are at or below the so-called AB floor level indicated at 23 inasmuch as the temperature curve across the rising glass sheet S reaches a substantially leveled-out condition by the time the glass reaches this level. As illustrated, a damper 20 is located immediately above the level of the first roll set indicated by the center line CL1, and another damper 20 is located three roll sets away at a point between the fourth and fifth rolls indicated by their center lines CL4 and CL5. The third damper 20 is located two roll sets thereabove at the point indicated between the center lines CL6 and CL7 of the sixth and seventh roll sets. Customary baffles for deflecting the flow of air, which are omitted from the drawing for the sake of clarity, may be provided in their usual diagonally disposed relationship within the lehr 12 to augment the effect of the dampers.

The dampers are alike and as shown in Figures 2 and 3 include a pair of fixed damper plates 24 and 26 which are horizontally held by braces 28 in permanently fixed positions on the lehr 12 and which define a slot-like opening with divergent straight edges 30 which cause it to widen at its ends. In contour these plates 24 and 26 in their adjacent areas are each triangular shaped and disposed symmetrically to the plane of the sheet of glass S. In one physically constructed embodiment of the invention the width W1 at the end of the damper opening slightly past that end of the sheet was slightly in excess of four times the width W2 at the minimum opening.

A set of adjustable tapered dampers 32 and 34 is arranged adjecent the edge of the damper plate 24 and another set 36 and 38 is similarly arranged adjacent the edge of the plate 26 with the dampers of each set extending in opposite directions. At the narrow inner ends thereof the adjustable dampers 32, 34, 36 and 38 are mounted on their respective plates in a common area on vertically extending pivots 40 to move on fixed axes. At the outer end each adjustable damper carries an eye-bolt type lug 42 which in the eye thereof receives the inner end of an individual adjusting screw 44. The screw 44 turns in the lug 42 but is retained in the eye thereof by means of a pair of fixed spaced collars 46 thereon which cause the adjustable damper to move with its individual screw. The adjusting screws 44 are preferably short shafts threaded on only one end and they are rotated by means of the adjusting handles 22. A combined bearing and nut 48 secured to the side of the lehr 12 at the opening through which each screw shaft 44 protrudes forms a connection with a set of threads 50 on the latter enabling the screw 44 to move substantially normal to the wall of the lehr incident to rotation thereof.

In Figure 2, the adjustable dampers 34 and 38 are shown in their wide open position affording the damper opening its maximum dimensions which conform with the damper plates 24 and 26. The opening is adjustable to varying widths in its lengthwise direction by moving all dampers partially or all the way from the wide open position illustrated by the dampers 34 and 38 into the other extreme position illustrated by the dampers 32 and 36 wherein the slot-like damper opening has uniform width from end to end.

Figure 4:
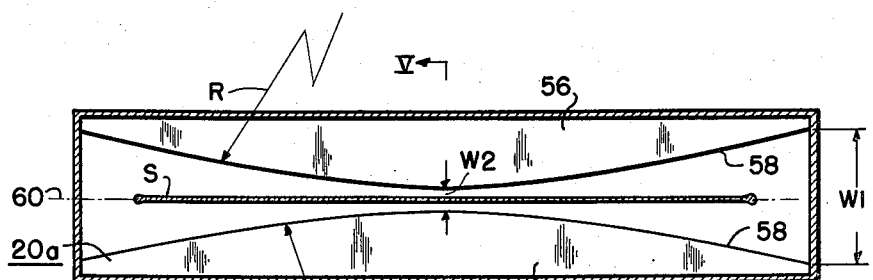
Figure 5:
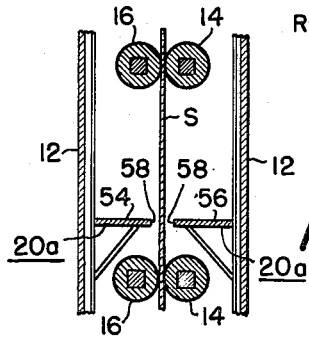

In the modification of Figures 4 and 5, each damper 20a consists of two plates 54 and 56 only, defining a fixed damper opening at each level where located and which is similar manner to the preceding embodiment has a minimum width W2 in the center. From the center outwardly, the edges 58 of the damper plates are smoothly contoured and actually as illustrated they are curved on the arc of a circle with a radius R in divergent relationship causing the damper opening to have a wider contour at the ends. Regardless of the particular contour selected, the plates 54 and 56 are preferably symmetrical on opposite sides of the plane 60 of the sheet drawn.

It is apparent that the minimum opening at the center of the plates in the embodiments of Figures 2 and 4 introduces added resistance to the flow of the hot gases tending to rise in the lehr and thus causes these gases to divert laterally in the desired manner towards the end of the lehr. Thus, the atmospheric temperatures and relative glass temperatures are forced into the more desirable theoretical cooling curve for proper annealing and cooling. Faster drawing speeds can, therefore, be achieved from the better annealing and cooling obtained.

By providing adjustable control in the manner of the adjustable dampers of Figure 2, we are further able to distribute and control air pressures and flow so as to stablize the heat across the width of the sheet. Thus, the present arrangement provides equal transfer of heat from the glass to the surrounding atmosphere. By this statement we do not mean to imply that the temperature at various points on the sheet are necessarily equal. The temperature of the edges of the rising sheet may be somewhat lower than those prevailing intermediate the edges. When stating that the temperatures are rendered uniform, we mean that the temperature gradient or curve from the center to each edge is substantially uniform in comparison to former processes where the temperature gradient fluctuates materially. Also, due to the division of the lehr into compartments as a result of the dampers, the temperature curves lengthwise of the sheet are appreciably smoothed.

Variations within the spirit and scope of the invention described are equally comprehended by the foregoing description.

We claim:

1. Glass drawing apparatus comprising sets of rolls for drawing a sheet of the glass therethrough, a plurality of transversely disposed dampers between two adjacent sets of rolls and arranged with sets of the dampers disposed one at each side of the glass with the dampers of each set extending in opposite directions, said dampers being closely spaced apart at their inner ends, horizontal adjustment means individual to the outer ends of the dampers to swing them away from the glass in limited angular paths of motion about their inner ends, fixed damper plates having portions for supporting said dampers, and means of attachment of the dampers to the supporting portions of the damper plates so as to mount the inner ends of the dampers on individual pivotal axes.

2. In glass drawing apparatus having an elongated chamber through which a sheet of the glass is drawn, the improvement comprising transversely disposed draft damper plates fixed in confronting relationship therein to define a restricted damper opening for the glass sheet, the confronting edges of said plates diverging from their centers whereby said opening for said sheet has minimum width at its center and a maximum width at its ends, and adjustable damper means with straight edges to further restrict said opening to an effective width which is uniform between the ends.

3. In glass drawing apparatus having an elongated chamber through which a sheet of the glass is drawn, the improvement comprising transversely disposed damper plates fixed in confronting relationship therein to define a damper opening for the glass sheet, the confronting edges of said plates diverging from their centers whereby said opening for said sheet has minimum width at its center and a maximum width at its ends, a set of oppositely extending adjustable dampers mounted adjacent the edge of each plate for swinging movement on a pivotal axis passing through their inner end, and means connected to move individual ones of the adjustable dampers into adjusted positions.

4. Glass drawing apparatus formed with an elongated lehr chamber and comprising successive sets of rolls for drawing a sheet of glass through the chamber, damper means intervening among the lower sets of rolls at locations between at least every three sets of rolls and defining a restricted damper opening at each location for the glass, each of said damper means comprising transversely disposed damper plates with edges fixed in confronting relationship to define said restricted damper opening, associated sets of oppositely extending adjustable dampers mounted adjacent the edge of each plate for swinging movement on a pivotal axis passing through their inner end, adjustable shafts protruding through the wall of said chamber and connected to the outer end of different ones of said dampers, and means for adjusting the shafts to move the dampers into independently adjusted positions.

5. Glass drawing apparatus formed with an elongated lehr chamber and comprising successive sets of rolls for drawing a sheet of glass through the chamber, damper means intervening among the lower sets of rolls at locations between at least every three sets of rolls and defining a restricted damper opening at each location in the path of the glass, each of said damper means comprising transversely disposed damper plates with edges fixed in confronting relationship to define said restricted damper opening, associated sets of oppositely extending adjustable dampers mounted adjacent the edge of each plate for swinging movement on a fixed axis passing through their inner end, said damper plates having straight edges and said associated sets of dampers likewise having straight edges which when adjusted properly coincide therewith, and a plurality of adjusting shafts protruding through the wall of said chamber and having means connecting different ones of the dampers thereto for movement therewith.

6. Glass drawing apparatus formed with an elongated chamber and comprising successive sets of rolls for drawing a sheet of glass through the chamber, damper means intervening among the lower sets of rolls at locations between at least every three sets of adjacent rolls at a level immediately above the level of the closest set of rolls therebelow, and defining a damper opening at each location for the glass, each of said damper means in said chamber comprising transversely disposed damper plates in confronting relationship therein to define the damper opening in a manner to have a minimum width at the center, with the adjacent edges of said plates arranged in a uniformly diverging relationship therefrom causing the opening to consistently gradually widen toward the ends, the resistance thus presented to the flow of ambient gases in the apparatus through said damper means at their ends being of a comparatively lesser magnitude whereas more resistance is offered to the upwardly flowing atmosphere near the center of the opening of the damper means.

References Cited in the file of this patent

UNITED STATES PATENTS

| | | |
|---|---|---|
| 980,520 | Hatton | Jan. 3, 1911 |
| 1,334,569 | Temple et al. | Mar. 23, 1920 |
| 1,525,132 | Hitchcock | Feb. 3, 1925 |
| 1,771,180 | Kutchka | July 22, 1930 |
| 1,999,588 | Fox et al. | Apr. 30, 1935 |
| 2,691,247 | Henry et al. | Oct. 12, 1954 |

FOREIGN PATENTS

| | | |
|---|---|---|
| 1,737 | Great Britain | 1899 |